(12) United States Patent
Chuang et al.

(10) Patent No.: US 6,822,709 B1
(45) Date of Patent: Nov. 23, 2004

(54) TRANSFLECTIVE DISPLAY DEVICE

(75) Inventors: Li-Sen Chuang, Penghu (TW); Wei-Chih Chang, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/668,903

(22) Filed: Sep. 23, 2003

(51) Int. Cl.$^7$ .................. G02F 1/1335; G02F 1/1336
(52) U.S. Cl. .................. 349/113; 349/102; 349/114; 349/117; 349/180
(58) Field of Search .................. 349/96, 106, 113, 349/114, 117, 180, 102, 179

(56) References Cited

U.S. PATENT DOCUMENTS

2002/0041351 A1 * 4/2002 Baek, II ................. 349/114
2003/0021000 A1 * 1/2003 Takizawa et al. ........... 359/263
2004/0004687 A1 * 1/2004 Baek, II ................. 349/114

* cited by examiner

Primary Examiner—Toan Ton
Assistant Examiner—Tai Duong
(74) Attorney, Agent, or Firm—Quintero Law Office

(57) ABSTRACT

A transflective display device has an upper substrate, a lower substrate and a liquid crystal layer interposed therebetween. A reflective electrode layer is formed overlying the inner surface of the lower substrate to serve as a reflective area of a pixel electrode. A transparent electrode layer is formed overlying the inner surface of the lower substrate, in which the transparent electrode layer not covered by the reflective electrode layer serves as a transmissive area of a pixel electrode. A first polarizer is formed overlying the outer surface of the upper substrate. A second polarizer is formed overlying the outer surface of the lower substrate. An optical compensation plate is formed between the second polarizer and the lower substrate.

12 Claims, 4 Drawing Sheets

TRANSFLECTIVE DISPLAY DEVICE

BACKGROUND OF THE INVENTION

1. Field of the Invention

The invention relates to a transflective display device, and more particularly to a transflective liquid crystal display (LCD) device with an optical supplement structure for improving viewing angle, increasing light recycling rate and reducing thickness thereof.

2. Description of the Related Art

Liquid crystal display (LCD) devices are usually classified as transmissive type or reflective type according to the difference in their display light source. The transmissive type LCD device uses a back light module, in which the light is incident to an LC layer and is absorbed or passes through the LC layer, thus the disadvantages of faded color and reduced contrast ratio occur under a natural light source or an artificial exterior light source. Conversely, the reflective type LCD device relies on ambient incident light from an exterior light source, and offers superior performance and high contrast under outdoor sunlight. Also, because of its low power consumption, the reflective type LCD devices are primarily employed in portable display products. The quality of reflective type LCD devices, however, suffers when the exterior light source is obscured, and it is comparatively difficult to achieve high resolution for a full color display. Accordingly, transflective LCD devices have been developed to compensate for the previously mentioned disadvantages and combine the advantages of reflective and transmissive LCD devices. The transflective LCD device can use well known active driving processes, such as amorphous silicon thin film transistors (a-Si TFTs) or low temperature polysilicon (LTPS) TFTs, and is applicable to low power products.

FIG. 1 is a cross-section of a conventional transflective LCD device. A transflective LCD device 10 comprises an upper substrate 12, a lower substrate 14 and an LC layer 16 interposed therebetween. Adjacent to the inner surface of the upper substrate 12, opposing the LC layer 16, lies a color filter and a common electrode layer 18. On the outer surface of the upper substrate 12, a first quarter-wave plate (QWP) 20I, a first half-wave plate (HWP) 22I and a first polarizer 24I are successively formed. The first HWP 22I has an optical retardation of $\lambda/2$, and the first QWP 20I has an optical retardation of $\lambda/4$, in which "$\lambda$" indicates a wavelength of the incident light.

On the inner surface of the lower substrate 14, opposing the LC layer 16, a transparent electrode layer 26, a passivation layer 28 and a reflective electrode layer 30 are successively formed, in which the transparent electrode layer 26 and the reflective electrode layer 30 act together as a pixel electrode. Also, an opening 29 is formed to penetrate the central portions of the reflective electrode layer 30 and the passivation layer 28, thus the exposed portion of the transparent electrode layer 26 serves as a transmissive area T of the pixel electrode, and the overlapped portion between the reflective electrode layer 30 and the transparent electrode layer 26 serves as a reflective area R of the pixel electrode. On the outer surface of the lower substrate 14, a second QWP 20II, a second HWP 22II and a second polarizer 24II are successively formed. The second HWP 22II has an optical retardation of $\lambda2$, and the second QWP 20II has an optical retardation of $\lambda4$. Additionally, a backlight device 32 is arranged adjacent to the second polarizer 24II.

Operation of the transflective LCD device 10 is described in the following. First, in reflective mode, external incident light is reflected from the reflective electrode layer 30 (the reflective area R of the pixel electrode), and is directed toward the upper substrate 12. At this point, when electrical signals are applied to the reflective electrode layer 30 by a switching element (such as a TFT device), the arrangement of LC molecules in the LC layer 16 varies and thus the reflected light is colored by the color filter, thereby displaying a color image. Second, in the transmissive mode, the light emitted from the backlight device 32 passes through the opening 29 (the transmissive area T of the pixel electrode). At this point, when the electrical signals are applied to the transparent electrode layer 26 by the switching element, the arrangement of LC molecules in the LC layer 16 varies and thus the light passing through the LCD device 10 is colored by the color filter, thereby forming a color image.

The object of forming the retardation films including the first QWP 20I, the second QWP 20II, the first HWP 22I and the second HWP 22II on both substrates 12 and 14 is to expand the optical compensation effect through the broadwavelength light band. Also, in one pixel area, the LC layer 16 has a first cell gap over the reflective area R and a second cell gap over the transmissive area T, thus the phase retardation in the transmissive area T is twice the phase retardation in the reflective area R. The difference in the phase retardation between the reflective area R and the transmissive area T, nevertheless, impedes the retardation films to achieve the accurate optical compensation. Accordingly, based on the dual cell gaps design, reducing the cell thickness of the transflective LCD device 10 and reducing the thickness of each retardation film are considered. Moreover, the first QWP 20I and the second QWP 20II limit the viewing angle within the transmissive area T, thus a novel structure to solve the problem of narrowed viewing angle is called for.

The light recycling effect between the backlight device 32 and the reflective area R is concerned with the optical structure including the QWPs 20I and 20II and HWPs 22I and 22II. FIG. 2 is a cross-section illustrating the light recycling effect between the backlight device 32 and the reflective area R. When a first incident light 33 emitted from the backlight device 32 passes through the second polarizer 24II, the second HWP 22II and the second QWP 20II, the first incident light 33 is weakened and becomes a second incident light 34. When directed toward the upper substrate 12, the second incident light 34 is reflected from the reflective electrode layer 30 to form a first reflective light 35. After passing the second QWP 20II, the second HWP 22II and the second polarizer 24II, the first reflected light 35 is further weakened and becomes a second reflected light 36. Accordingly, the incident light and the reflected ight completely pass through the second QWP 20II and the second HWP 22II twice, and are mostly absorbed and weakened causing the second reflected light 36 to be extremely weak and incapable of being recycled. Thus, the light recycling rate is too low to provide adequate illumination, and a greater power is required to increase the light intensity of the backlight device 32 in order to improve the luminescent property of the transflective LCD device 10.

SUMMARY OF THE INVENTION

Accordingly, an object of the present invention is to provide a transflective display device with an optical supplement structure to achieve a smaller size, a thinner profile, and a lower cost.

Another object of the present invention is to provide a transflective display device with an optical supplement structure to achieve superior display performance at a wide viewing angle.

Another object of the present invention is to provide a transflective display device with an optical supplement structure to increase the light recycling rate.

Another object of the present invention is to provide a transflective display device with an optical supplement structure to achieve greater brightness and higher resolution.

According to the object of the invention, a transflective LCD device has an upper substrate, a lower substrate and a liquid crystal layer interposed therebetween. A reflective electrode layer is formed overlying the inner surface of the lower substrate to serve as a reflective area of a pixel electrode. A transparent electrode layer is formed overlying the inner surface of the lower substrate, in which the transparent electrode layer not covered by the reflective electrode layer serves as a transmissive area of a pixel electrode. A first polarizer is formed overlying the outer surface of the upper substrate. A second polarizer is formed overlying the outer surface of the lower substrate. An optical compensation plate is formed between the second polarizer and the lower substrate.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
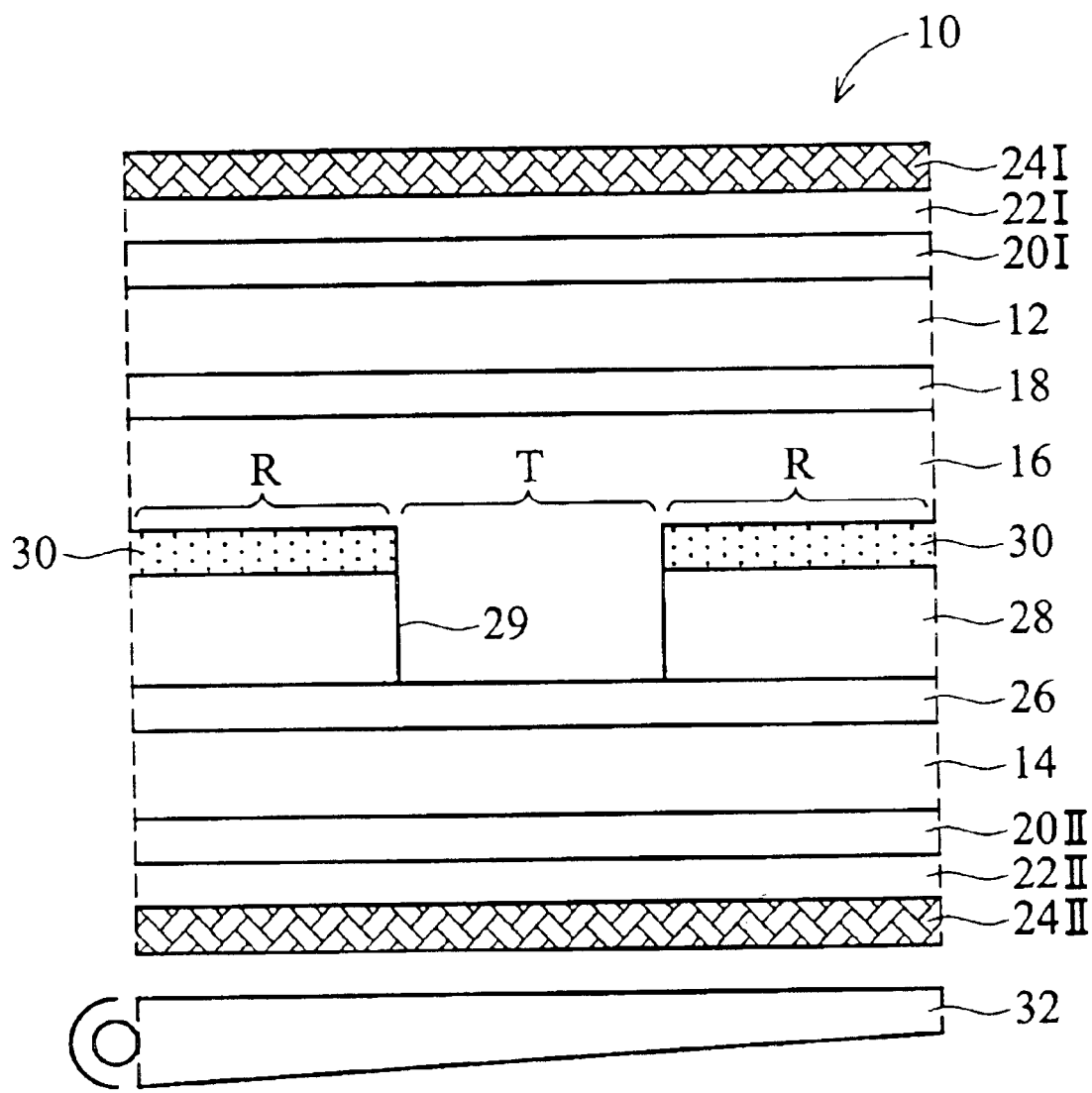
FIG. 1 is a cross-section of a conventional transflective LCD device.
Figure 2:
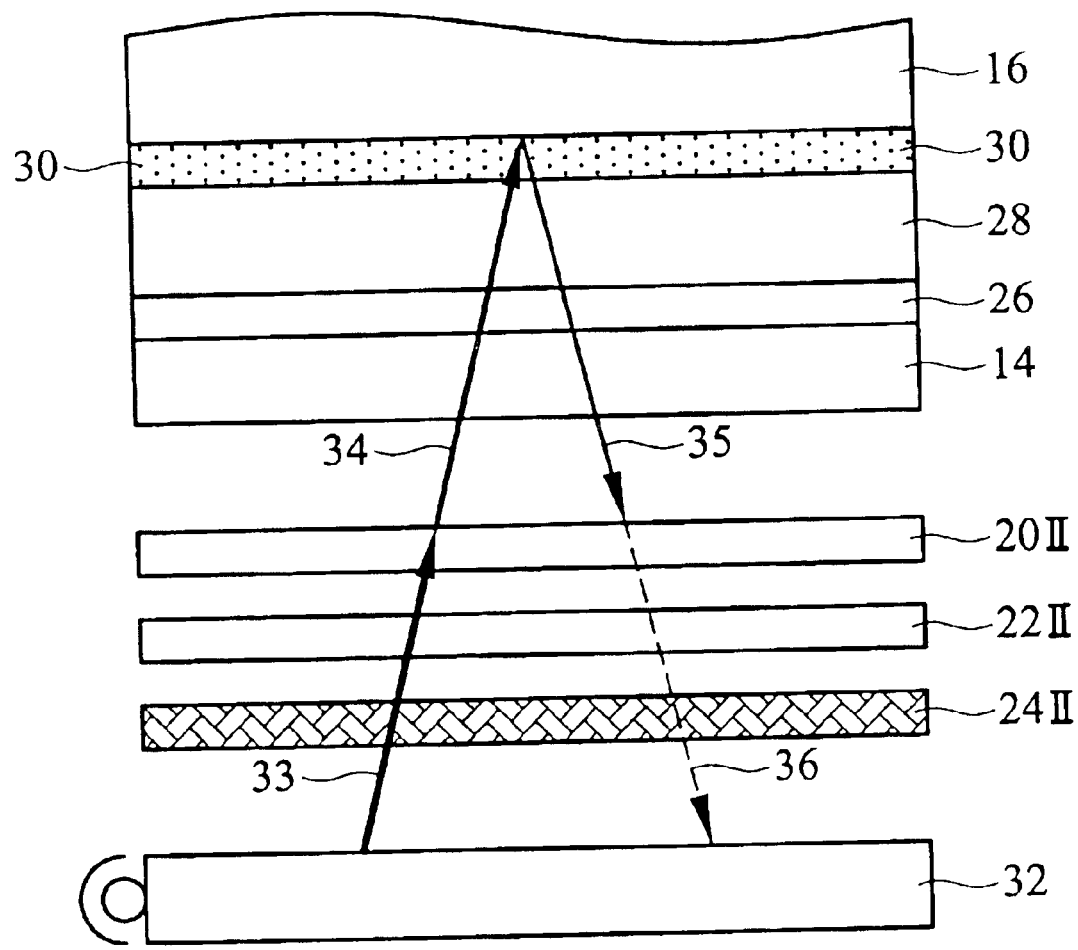
FIG. 2 is a cross-section illustrating the light recycling effect between the backlight device and the reflective area according to the conventional transflective LCD device.
Figure 3:
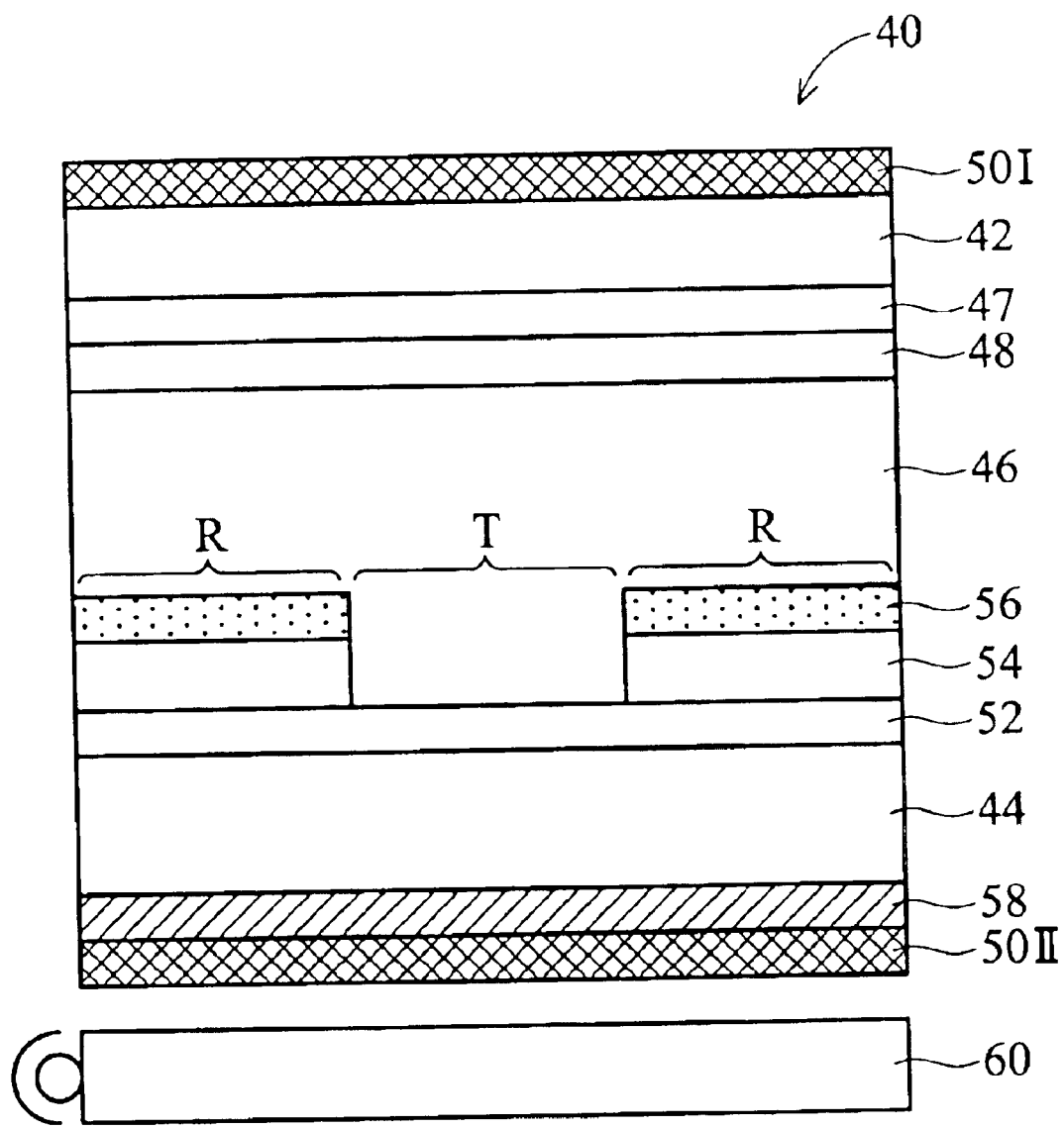
FIG. 3 is a cross-section of a transflective LCD device according to the present invention.

FIG. 3 is a cross-section of a transflective LCD device according to the present invention. A transflective LCD device 40 comprises an upper substrate 42, a lower substrate 44 and an LC layer 46 interposed therebetween. On the inner surface of the upper substrate 42, opposing the LC layer 46, a color filter layer 47 and a common electrode layer 48 are successively formed. On the outer surface of the upper substrate 42, a first polarizer 50I is formed.

On the inner surface of the lower substrate 44, opposing the LC layer 46, a transparent electrode layer 52, a passivation layer 54, and a reflective electrode layer 56 are successively formed. The pattern of the reflective electrode layer 56 serves as a reflective area R of a pixel electrode, and the exposed portion of the transparent electrode layer 52 serves as a transmissive area T of the pixel electrode. On the outer surface of the lower substrate 44, an optical compensation plate 58 and a second polarizer 50II are successively formed. The optical compensation plate 58 is used as a phase retardation film to expand an optical compensation effect through the broad-wavelength light band. In each pixel area, the optical compensation plate 58 can accurately achieve the optical compensation effect for the transmissive area T as well as the reflective area R. Additionally, a backlight device 60 is disposed adjacent to the second polarizer 50II.

Operation of the transflective LCD device 40 is described in the following. First, in the reflective mode, the incident light from the outside is reflected from the reflective electrode layer 56 (the reflective area R of the pixel electrode), and is directed toward the upper substrate 42. At this point, when the electrical signals are applied to the reflective electrode layer 56 by a switching element (such as a TFT device), arrangement of LC molecules in the LC layer 46 varies and thus the reflected light of the incident light is colored by the color filter layer 47 and displays a color image. Second, in the transmissive mode, the light emitted from the backlight device 60 passes through the exposed portion of the transparent electrode layer 52 (the transmissive area T of the pixel electrode). At this point, when the electrical signals are applied to the transparent electrode layer 52 by the switching element, arrangement of LC molecules in the LC layer 46 varies and thus the light passing through the LCD device 40 is colored by the color filter layer 47 and displays a color image.

The present invention provides the transflective LCD device 40 with an optical supplement structure including the first polarizer 50I, the optical compensation plate 58 and the second polarizer 50II. Preferably, the optical compensation plate 58 is a half-wave plate (HWP) having a phase retardation of $\lambda/2$. The first polarizer 50I has a transmissive axis (absorption axis) perpendicular to a transmissive axis (absorption axis) of the second polarizer 50II, and the optical compensation plate 58 has a slow axis disposed at a 45° angle to the transmissive axis of the second polarizer 50II. Moreover, the twisting angle of the LC molecules in the LC layer 46 is 0°~50°. The patterns of the transparent electrode layer 52, the passivation layer 54, and the reflective electrode layer 56 and the cell gap design for the LC layer 46 are not limited in the present invention.

Figure 4:
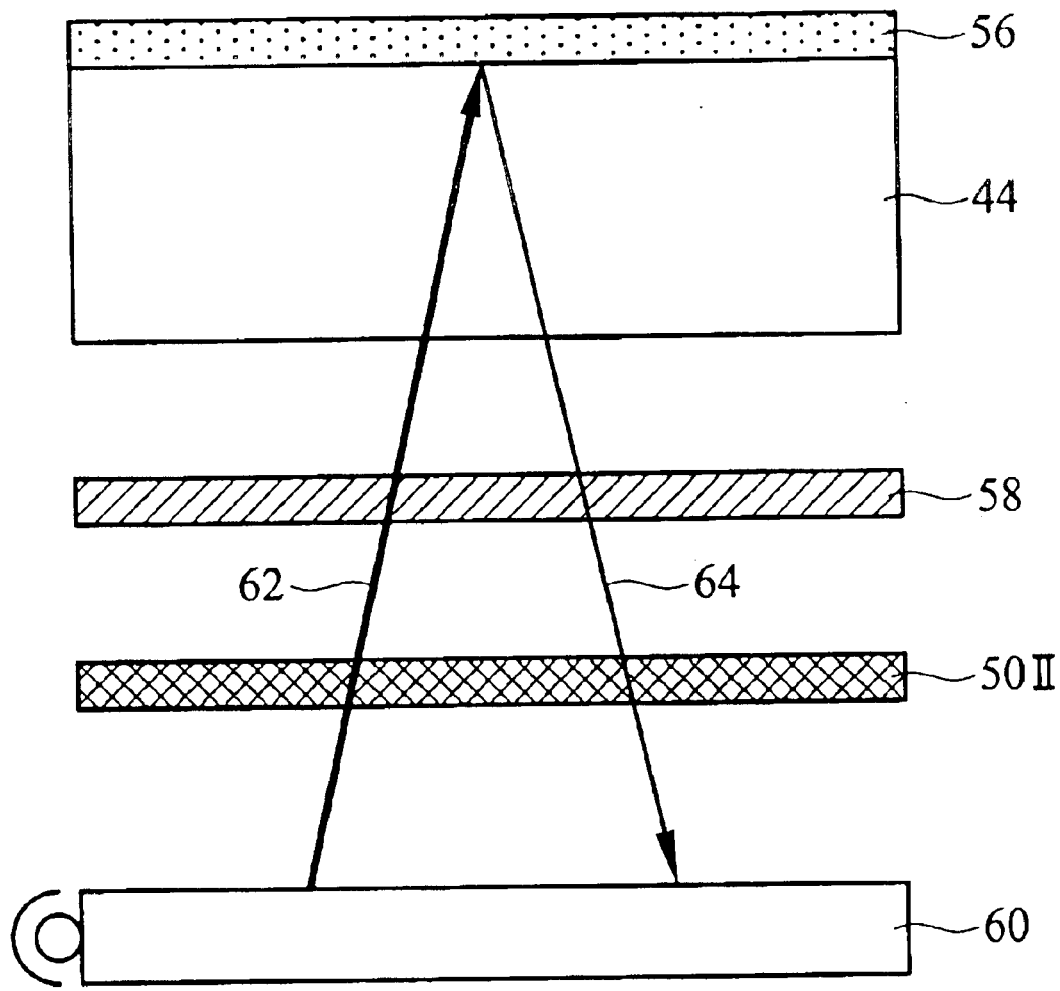
FIG. 4 is a cross-section illustrating the light recycling effect between the reflective area and the backlight device according to the present invention.

Additionally, the optical supplement structure can effectively improve the light recycling rate between the reflective area R and the backlight device 60. FIG. 4 is a cross-section illustrating the light recycling effect between the reflective area R and the backlight device 60 according to the present invention. When an incident light 62 emitted from the backlight device 60 passes through the second polarizer 50II and the optical compensation plate 58 to reach the reflective electrode layer 56, the incident light 62 is reflected from the reflective electrode layer 56 serving as a reflective plate to generate a reflective light 64. Then, after passing the optical compensation plate 58 and the second polarizer 50II, the reflective light 64 is recycled. With regard to the light recycling effect between the backlight device 60 and the reflective area R, the incident light 62 and the reflective light 64 completely passes through the optical compensation plate 58 twice. Compared with the conventional LCD device having two retardation films between the reflective area and the backlight device, the present invention provides one optical compensation plate 58 between the reflective area R and the backlight device 60 to reduce the light absorptivity of the incident light 62 and the reflective light 64, resulting in a higher light recycling rate. This can improve the luminescent property of the transflective LCD device 40 without requiring additional power to increase the light intensity of the backlight device 60.

The transflective LCD device 40 with the optical supplement structure including the first polarizer 50I, the optical compensation plate 58 and the second polarizer 50II has the following advantages. First, the thickness of the optical supplement structure is decreased to fulfill requirements of lighter weight, thinner profile and lower cost for the transflective LCD device 40. Second, the problem of the narrowed viewing angle in the transmissive area T is solved by omitting the QWP or HWP on the outer surface of the upper substrate 42, thus achieving a wider viewing angle and superior display performance. Third, the optical compensation plate 58 is the only film disposed between the lower substrate 44 and the second polarizer 50II, thus a higher light recycling rate is obtained. This can improve brightness and resolution of the transflective LCD device 40 without requiring additional power to increase the light intensity of the backlight device 60.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective display device, comprising:

an upper substrate and a lower substrate;

a liquid crystal layer interposed between an inner surface of the upper substrate and an inner surface of the lower substrate;

a reflective electrode layer formed overlying the inner surface of the lower substrate to serve as a reflective area of a pixel electrode;

a transparent electrode layer formed overlying the inner surface of the lower substrate to serve as a transmissive area of the pixel electrode;

a first polarizer having a first transmissive axis disposed on an outer surface of the upper substrate; and a second polarizer having a second transmissive axis disposed over an outer surface of the lower substrate;

wherein the transflective display device as a whole comprises only one half-wave plate (HWP) disposed between the second polarizer and the lower substrate.

2. The transflective display device as claimed in claim 1, further comprising a backlight device disposed adjacent to the second polarizer.

3. The transflective display device as claimed in claim 1, wherein the half-wave plate (HWP) has a phase retardation of 80 /2.

4. The transflective display device as claimed in claim 1, wherein the first transmissive axis is perpendicular to the second transmissive axis.

5. The transflective display device as claimed in claim 1, wherein the half-wave plate has a slow axis disposed at a 45° angle to the second transmissive axis.

6. The transflective display device as claimed in claim 1, wherein the liquid crystal molecules in the liquid crystal layer have a twisting angle of 0°–50°.

7. The transflective display device as claimed in claim 1, further comprising a color filter layer formed overlying the inner surface of the upper substrate.

8. The transflective display device as claimed in claim 1, further comprising a common electrode layer formed overlying the inner surface of the upper substrate.

9. A transflective display device, comprising:

an upper substrate and a lower substrate;

a liquid crystal layer comprising liquid crystal molecules interposed between an inner surface of the upper substrate and an inner surface of the lower substrate, wherein the liquid crystal molecules in the liquid crystal layer have a twisting angle of 0°~50°;

a reflective electrode layer formed overlying the inner surface of the lower substrate to serve as a reflective area of a pixel electrode;

a transparent electrode layer formed overlying the inner surface of the lower substrate to serve as a transmissive area of the pixel electrode;

a first polarizer having a first transmissive axis disposed on an outer surface of the upper substrate;

a second polarizer having a second transmissive axis perpendicular to the first transmissive axis disposed over an outer surface of the lower substrate; and a single optical compensation plate having a phase retardation of $\lambda/2$ disposed between the second polarizer and the lower substrate, wherein said single optical compensation plate has a slow axis disposed at about 45° to the second transmissive axis, and said single optical compensation plate is the only optical compensation plate included in the transflective display device as a whole.

10. The transflective display device as claimed in claim 9, further comprising a backlight device disposed adjacent to the second polarizer.

11. The transflective display device as claimed in claim 9, further comprising a color filter layer formed overlaying the inner surface of the upper substrate.

12. The transflective display device as claimed in claim 9, further comprising a common electrode layer formed overlying the inner surface of the upper substrate.

* * * * *